(12) United States Patent
Uematsu et al.

(10) Patent No.: US 6,433,503 B1
(45) Date of Patent: Aug. 13, 2002

(54) SYNCHRONOUS MOTORS AND CONTROL CIRCUITS THEREFOR

(75) Inventors: Tatsuya Uematsu; Norimoto Minoshima, both of Kariya (JP)

(73) Assignee: Kabushiki Kaisha Toyoda Jidoshokki Seisakusho, Kariya (JP)

( * ) Notice: Subject to any disclaimer, the term of this patent is extended or adjusted under 35 U.S.C. 154(b) by 0 days.

(21) Appl. No.: 09/533,755

(22) Filed: Mar. 23, 2000

(30) Foreign Application Priority Data

Mar. 25, 1999 (JP) ............................................ 11-081712

(51) Int. Cl.[7] ................................................. H02P 7/36
(52) U.S. Cl. ...................... 318/700; 318/711; 318/717; 318/721; 318/724; 318/280; 318/647; 318/652
(58) Field of Search ................................. 318/700, 711, 318/717, 721, 724, 280, 647, 652; 310/68, 216

(56) References Cited

U.S. PATENT DOCUMENTS

| | | | |
|---|---|---|---|
| 4,577,139 A | 3/1986 | Reinhardt et al. | ......... 318/254 |
| 4,763,049 A | 8/1988 | Magee | ......... 318/254 |
| 5,793,139 A | * 8/1998 | Nashiki | ......... 310/216 |
| 6,211,588 B1 | * 4/2001 | Balsiger | ......... 310/68 |

FOREIGN PATENT DOCUMENTS

| | | | |
|---|---|---|---|
| JP | 5-176514 | 7/1993 | |
| JP | 6-165464 | 6/1994 | |
| WO | WO 98/52275 | 11/1998 | ............. H02P/6/14 |

* cited by examiner

Primary Examiner—Karen Masih
(74) Attorney, Agent, or Firm—Morgan & Finnegan, LLP (57) ABSTRACT

Hall ICs 23u, 23v and 23w are provided to detect the magnetic fields of magnetic regions 8 of a rotor 9 and are offset in position by an electrical angle of 30° from central positions of a U-phase stator pole 1, V-phase stator pole 6 and W-phase stator pole 2. A driving circuit 21 controls the timing of rotor driving signals that are supplied to respective stator coils for respective phases based upon rotor position signals outputted from the Hall ICs 23u through 23w. For example, in order to rotate the rotor in a forward direction, the driving circuit 21 controls the timing of the rotor driving signals according to a first logic. Similarly, in order to rotate the rotor in a reverse direction, the driving circuit 21 controls the timing of the rotor driving signals according to a second logic. A delay circuit 17 may delay the rotor position signals outputted from a position detector 23 by delay time according to the rotating speed of the reluctance motor so as to supply delayed signals to the driving circuit 21.

19 Claims, 6 Drawing Sheets

SYNCHRONOUS MOTORS AND CONTROL CIRCUITS THEREFOR

BACKGROUND OF THE INVENTION

1. Field of the Invention

The present invention relates to synchronous motors and synchronous motor control circuits for controlling the electric signals supplied to the motor to drive the rotor. More particularly, the present invention relates to synchronous motor control circuits capable of generating phase timing signals that are supplied to the respective stator coils, which signals are generated based upon output signals of a rotor position detector.

2. Description of the Related Art

Figure 5:
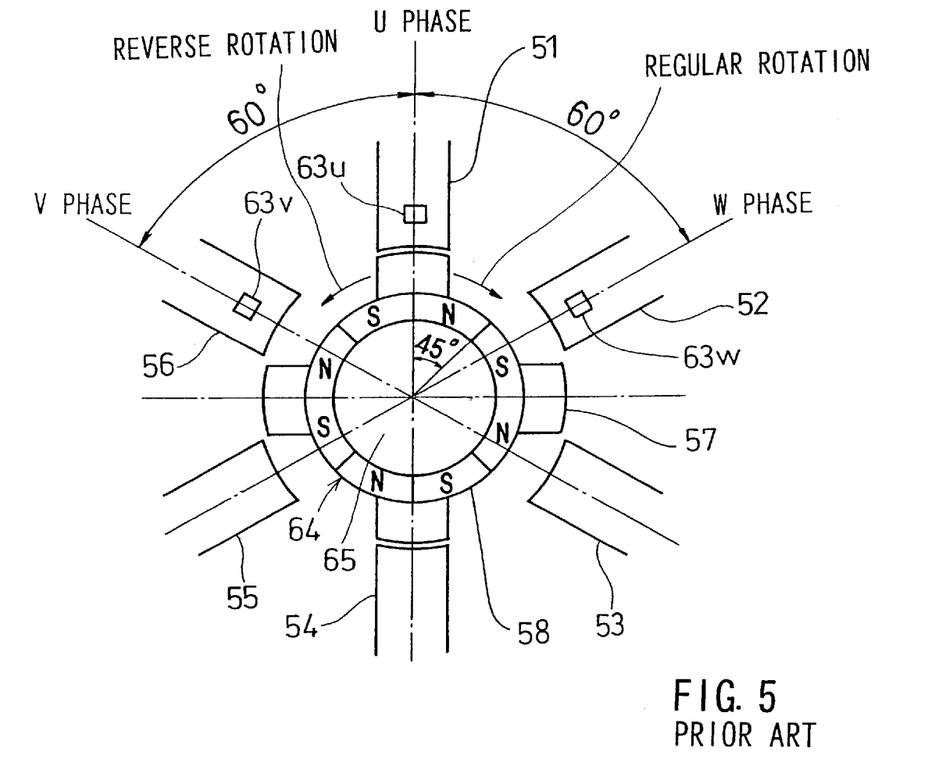
FIG. 5 is a diagram showing a known 3-phase SR motor.

FIG. 5 shows a known switched reluctance motor ("SR motor") or commutator-less motor. This SR motor is a 6-4-pole three-phase SR motor having a stator and a rotor. The stator includes a stator core with six stator poles 51–56 that are physically spaced at 60° intervals, which corresponds to electrical angles of 120°. Coils are wound around the respective stator poles 51–56. Coils wound around two opposing stator poles are electrically connected in series to provide an opposing pair of stator coils that will be energized by the same control signal. For example, the coils wound around stator poles 51 and 54 are connected with each other in series. The three sets of electrically coupled coils are respectively energized in each of the respective three phases, i.e., U-phase, V-phase and W-phase.

The rotor 64 has a rotor core 65 with a rotating axis and magnetic rotor poles 57 projecting from the outer periphery of the rotor core 65. The magnets in the rotor 64 create eight magnetic regions 58, which each cover 45° intervals of the rotor 64.

A control circuit (not shown) controls the timing of the rotor drive (control) signals that are supplied to the stator coils for each of the respective three phases. The timing signals are generated based upon output signals from rotor position detectors. The control circuit generates rotor driving signals that cause the rotor to rotate either in a forward direction or a reverse direction. The known control circuit uses Hall ICs 63u, 63v and 63w as the rotor position detectors, which Hall ICs contain Hall elements for detecting the magnetic field of the rotor magnetic regions 58. A Hall IC (63u, 63v and 63w) is located at a central position of each stator pole (U-phase stator pole 51, V-phase stator pole 56 and W-phase stator pole 52, respectively).

Figure 6:
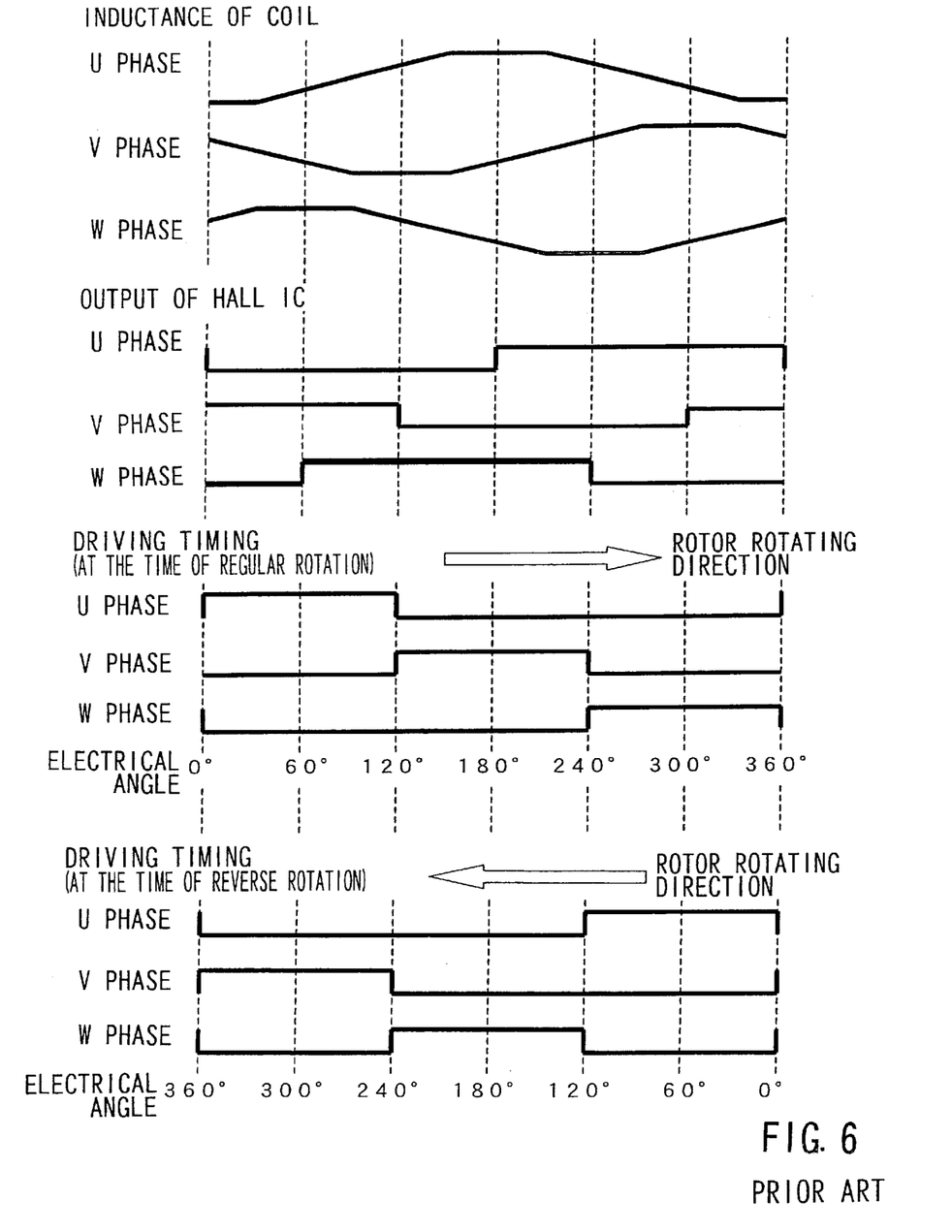
FIG. 6 is a diagram showing a relationship between rotor position signals generated by the rotor position detectors and the timing of rotor driving signals that are supplied to the respective stator coils for each of the respective phases according to the known SR motor.

FIG. 6 shows a timing chart with timing signals of a type suitable for driving a typical SR motor. This timing chart shows the relationship between rotor position signals output from the Hall ICs for each of the respective phases and rotor driving signals supplied to the stator coils for each of the respective phases. At the top, the inductance of each stator coil is shown in relation to the rotor position for each of the respective phases. In the second timing chart, the outputs of the Hall ICs (63u–63w) are shown for each of the respective phases according to the rotor position. If the rotor driving signals are supplied to the respective stator coils while the inductance of the respective stator coils is increasing, a torque (positive torque) is generated that causes the rotor to rotate in a first direction. On the other band, if the rotor driving signals are supplied to the respective stator coils while the inductance of the respective stator coils is decreasing, an opposite torque (negative torque) is generated that causes the rotor to rotate in a direction that is opposite to the direction that the rotor rotates when the positive torque is applied to the rotor.

In order to cause the rotor to rotate in the forward direction, the SR motor control circuit uses a forward rotation logic to control the timing of the rotor driving signals, which signals are supplied to the stator coils for each of the respective phases. The rotor driving signals are generated based upon the output signals of the Hall ICs 63u–63w for each of respective phases. For example, the rotor driving signals may be supplied to the U-phase coil, V-phase coil and W-phase coil in this order.

FIG. 6 also shows a timing chart for specific set of rotor driving signals to control the known SR motor. The rotor driving signal for the U-phase stator coil is initiated when Hall IC 63u detects the U-phase trailing edge signal. This U-phase rotor driving signal is terminated when Hall IC 63v detects the trailing edge signal of the V-phase. Similarly, the rotor driving signal for the V-phase stator coil is initiated when Hall IC 63v detects the V-phase trailing edge signal. This V-phase rotor driving signal is terminated when Hall IC 63w detects the trailing edge signal of the W-phase. Finally, the rotor driving signal for the W-phase stator coil is initiated when Hall IC 63w detects the W-phase trailing edge signal. This W-phase rotor driving signal is terminated when Hall IC 63u detects the trailing edge signal of the U-phase. In FIG. 6, when the rotor is rotating in the forward direction, the electrical angle is 0° with respect to the forward rotating direction (clockwise direction in FIG. 5, right direction in FIG. 6).

In order to cause the rotor to rotate in the reverse direction, the SR motor control circuit uses a reverse rotation logic to control the timing of the rotor driving signals, which signals are supplied to the stator coils for each of the respective phases. The rotor driving signals are generated based upon the output signals of the Hall ICs 63u–63w for each of the respective phases. For example, the rotor driving signals may be supplied to the U-phase coil, W-phase coil and V-phase coil in this order.

The rotor driving signal for the U-phase stator coil is initiated when Hall IC 63u detects the U-phase leading edge signal. This U-phase rotor driving signal is terminated when Hall IC 63w detects the leading edge signal of the W-phase. Similarly, the rotor driving signal for the W-phase stator coil is initiated when Hall IC 63w detects the W-phase leading edge signal. This W-phase rotor driving signal is terminated when Hall IC 63v detects the leading edge signal of the V-phase. Finally, the rotor driving signal for the V-phase stator coil is initiated when Hall IC 63v detects the V-phase leading edge signal. This V-phase rotor driving signal is terminated when Hall IC 63u detects the leading edge signal of the U-phase. In FIG. 6, when the rotor is rotating in the reverse direction, the electrical angle is 0° with respect to the reverse rotating direction (counterclockwise direction in FIG. 5, left direction in FIG. 6).

The start timing of the rotor driving signals supplied to the stator coils of respective phases (coil energizing start timing) may be advanced in order to improve motor operating efficiency. One method for advancing the start timing of the rotor driving signals includes providing the rotor position detectors in a position that is offset from the central position of a magnetic pole. Japanese Laid-Open Patent Publication No. 6-165464, for example, shows that this can be accomplished by advancing the position detectors by 30 electrical degrees. However, if only one offset rotor position detector is provided for each stator pole, the prior art has taught that the motor operating properties are different when the rotor is rotating in the forward direction as opposed to the reverse direction. Therefore, in these prior art systems it would be necessary to provide two rotor position detectors for each stator pole of a bi-directional motor, i.e., in both the forward rotating direction and reverse rotating direction of the rotor, each position detector being offset or shifted from the central position of the stator pole.

SUMMARY OF THE INVENTION

It is, accordingly, an object of the present invention to teach an improved synchronous motor and an improved control circuit for generating rotor driving signals that are supplied to the synchronous motor. By positioning the rotor position detectors appropriately, the number of rotor position detectors can be reduced as compared to the known reluctance motor described above. An advance angle can then be selected that will provide the same motor properties when the rotor is driven in the forward and reverse direction.

As a result of experiments that have been performed, it has been found that advancing a position detector a three-phase synchronous motor by an electrical angle of 30° in one rotating direction from a central position of a stator pole and rotor driving signals can be advanced by the electrical angle of 30° when the rotor rotates in both the forward direction and the reverse direction.

Consequently, the respective position detectors are preferably provided in positions that are advanced by an electrical angle of 30° from central positions of stator poles of a stator core in one rotating direction. A driving circuit will then adjust the timing of the rotor driving signals that are supplied to each of the respective stator coils according to either a first logic or a second logic based on rotor position signals generated by the rotor position detectors. If only one rotor position detector is provided per stator coil, naturally the number of the position detectors can be reduced as compared to the known synchronous motor.

In another aspect of the present teachings, a delay circuit may be provided, which delay circuit delays the communication of the rotor position signals generated by the rotor position detectors to the control circuit. The control circuit will then adjust the timing of the rotor driving signals to be supplied to the respective stator coils for each of the respective phases based upon the rotor position signals that are delayed by the delay circuit.

Preferably, the delay time generated by the delay circuit varies in accordance with the rotating speed of the reluctance motor. In this case, the advance angle can always be controlled by the advance angle that maximizes motor efficiency. The delay time generated by the delay circuit also can be selected to compensate for a positional error caused by incorrectly mounting one or more of the rotor position detectors. If it is possible to compensate for mounting error, manufacturing tolerances can be relaxed and the rotor position detector mounting operation can be simplified.

In a further aspect of the present teachings, the control circuit may adjust the rotor driving signals according to a difference detected between a desired rotational speed reference signal and a detected rotational speed signal.

Other objects, features and advantages of the present invention will be readily understood after reading the following detailed description together with the accompanying drawings and the claims.

DETAILED DESCRIPTION OF THE INVENTION

According to the present teachings, a preferred embodiment may include a synchronous motor having a stator with a plurality of stator poles. A corresponding plurality of coils may be wound around the stator poles. A rotor can be provided within the stator and have magnets that provide magnetic regions to the rotor. Preferably, a plurality of rotor position detectors are disposed on the stator poles. The respective rotor position detectors may be each disposed at a position that is advanced by an electrical angle of 30° in one rotating direction from a central position of each of the stator poles. Most preferably, a single rotor position detector is mounted to a stator pole and only one rotor position detector is mounted for each phase of the synchronous motor.

A rotor driving control circuit is preferably coupled to the rotor position detectors and controls the timing of rotor driving signals to be supplied to the respective coils for each respective phase. The rotor driving control circuit may utilize a first logic to generate rotor driving signals to rotate the rotor in a forward direction and the rotor driving control circuit may utilize a second logic to generate rotor driving signals to rotate the rotor in a reverse direction.

In another more preferred embodiment, the synchronous motor is a switched reluctance motor. Further, the rotor driving control circuit may optionally include a delay circuit for delaying the communication of the rotor position signals outputted from the rotor position detectors to the rotor driving control circuit. In such case, the rotor driving control circuit may control the timing of the rotor driving signals to be supplied to said stator coils for each of the respective phases based upon the rotor position signals that are delayed by said delay circuit. The delay time of said delay circuit can be set according to the rotating speed of the switched reluctance motor in order to improve the motor operating efficiency. In this case, the advance angle can always be controlled with an advance angle at which the motor operating efficiency is maximized. Moreover, the delay time of the delay circuit can be set to compensate for any errors in the positional mounting of the rotor position detectors. In this case, because errors in mounting of the position detectors can be corrected, the rotor position detector mounting operation is simplified.

The rotor driving control circuit also may optionally control the pulse width or the amplitude of the rotor driving signals to be supplied to said stator coils for each of the respective phases according to a detected difference between a desired rotational speed reference signal and a detected rotational speed signal. More particularly, the stator coils may be coupled to provide a three phase reluctance motor and the rotor position detectors may be Hall ICs.

The motor operation efficiency can be improved by utilizing a reluctance motor control circuit that controls the timing of rotor driving signals to be supplied respectively to stator coils of respective phases based on rotor position signals outputted from rotor position detectors so as to rotate the rotor in a forward direction or reverse direction. By advancing the timing of the rotor driving signals supplied to the stator coils of respective phases (advance angle control), the motor operational efficiency is further improved over known sunchronous motors.

In one preferred embodiment, the present teachings overcome a problem with the known synchronous motor by disposing the respective rotor position detectors in positions that are advanced by an electrical angle of 30° with respect to one rotating direction from the central position of each stator poles. As a result, by providing the rotor position detectors only in one rotating direction with respect to the central positions of the stator poles of the stator, the advance angle can be controlled with the same motor properties when the rotor rotates in the forward direction and reverse direction.

Each of the additional features and constructions disclosed above and below may be utilized separately or in conjunction with other features and constructions to provide improved synchronous motors and synchronous motor control circuits and methods for designing and using such synchronous motors and synchronous motor control circuits. Detailed representative examples of the present invention, which examples utilize many of these additional features and constructions in conjunction, will now be described in detail with reference to the drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe some representative examples of the invention, which detailed description will now be given with reference to the accompanying drawings.

Figure 1:
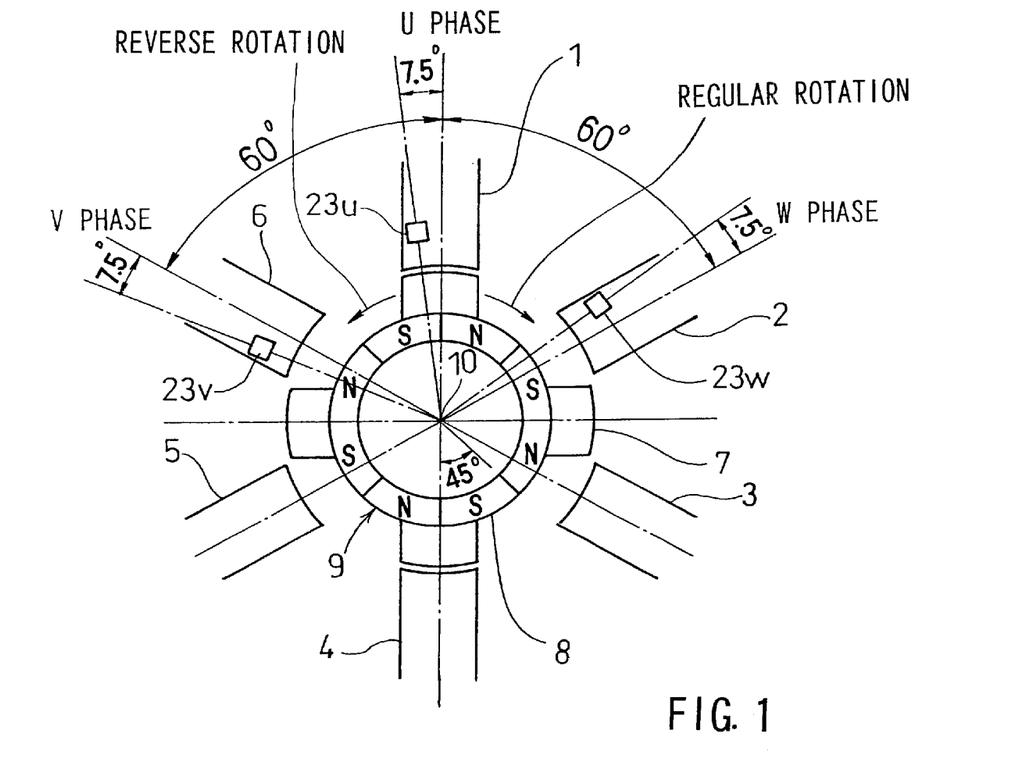
FIG. 1 is a diagram showing a representative three-phase SR motor according to the present teachings.

FIG. 1 shows a representative reluctance motor (also known as a commutatorless motor) that is a 6-4-pole three-phase SR motor having a stator and a rotor. The stator has a stator core with six stator poles 1–6 projecting at 60° intervals (which corresponds to an electrical angle of 120°). Each stator pole 1–6 has a coil wound around the stator pole 1–6. Two opposing coils (for example, stator poles 1 and 4) are connected in series so that coupled opposing coils of the respective phases (for example, U-phase coils, V-phase coils and W-phase coils) are formed.

The rotor 9 has a rotating axis 10, four rotor poles 7 projecting from the rotor and eight magnetic regions 8 that are generated, for example by a permanent magnet, and are disposed at 45° angles. Three rotor position detectors 23u, 23v, 23w are provided on three adjacent stator poles 1, 2 and 6 to detect the rotor position. The rotor position detectors may be Hall elements, magnetoresistive elements, Hall ICs comprising Hall elements or any detector that is capable of detecting the magnetic fields of the respective magnetic regions 8. In the present representative embodiment, Hall ICs 23u, 23v and 23w are provided in positions that are shifted or offset from the central position of each of the U-phase stator pole 1, V-phase stator pole 6 and W-phase stator pole 2 by a predetermined angle towards one rotating direction. In FIG. 1, the rotor position detectors 23u, 23v, 23w are shifted from the central position of the respective stator poles 1, 6 and 2 by an electrical angle of 30° (which corresponds to a mechanical angle of 7.5°) in the reverse rotating direction (counterclockwise direction).

Figure 2:
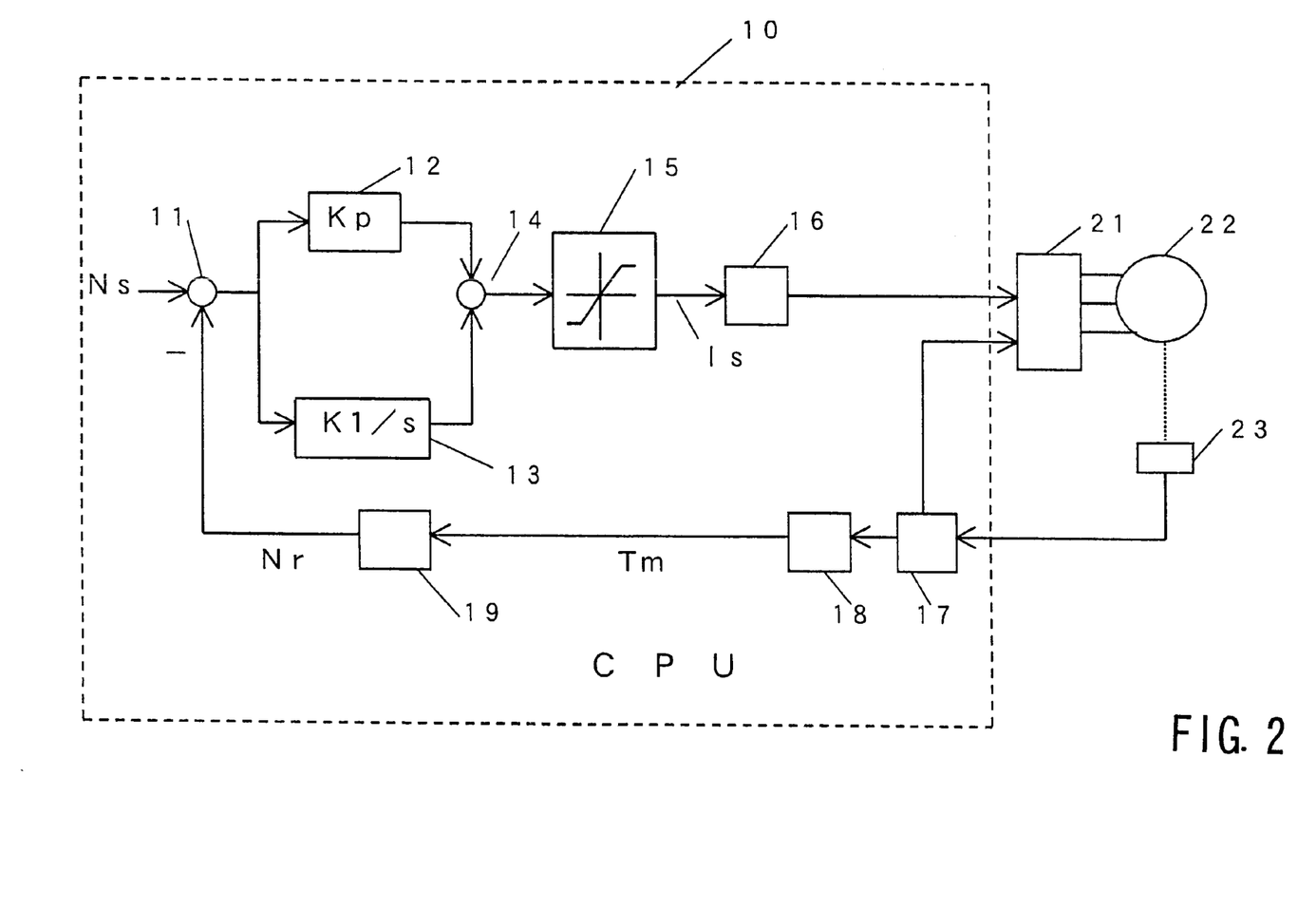
FIG. 2 is a block diagram showing a representative SR motor control circuit that can generate rotor driving signals for the SR motor of FIG. 1.

FIG. 2 is a block diagram showing a representative reluctance motor control circuit (also referred to as a rotor drive circuit control circuit), which preferably comprises a central processing unit (CPU) 10. As one example of a preferred CPU 10 for a preferred reluctance motor control circuit, a subtractor 11 is provided to generate a difference signal between a reference rotational speed signal Ns and a detected rotational speed signal Nr. Signal Ns represents a signal corresponding to a desired rotational speed for the SR motor. Signal Nr represents the actual operating rotational speed of the SR motor. Thus, the subtractor 11 determines the difference between the desired rotational speed and the actual rotational speed.

The difference signal generated by the subtractor 11 is coupled to an amplifier circuit 12 and an integrating circuit 13. An adder 14 adds signals outputted from the amplifier circuit 12 and the integrating circuit 13 so as to output a control signal Is to a limit circuit 15. A PWM (pulse width modulator) circuit 16 generates a PWM signal based upon the control signal Is outputted from the limit circuit 15 and supplies the control signal Is to a driving circuit 21. The driving circuit 21 comprises switching elements, such as transistors (for example, field-effect transistor FET) and thyristors. The driving circuit 21 selects the timing for applying the PWM signal (rotor drive signal) to the respective coils based upon the rotor position signals generated by the rotor position detectors 23. In general, as the pulse width or the amplitude (magnitude) of the PWM signal increases, the rotational speed of the SR motor will increase. Likewise, as the pulse width or the amplitude of the PWM signal decreases, the rotational speed of the SR motor will decrease. Thus, the difference signal generated by the subtractor 11 is ultimately utilized to determine the pulse width or the amplitude of the PWM signal and therefore, adjust the rotational speed of the SR motor.

All the above circuits may be designed using well-known analog or digital circuit techniques.

The position detectors 23 detect the rotor position within the SR motor 22 and output a rotor position signal, which rotor position signal is coupled to delay circuit 17. The delay circuit 17 delays providing the rotor position signal to the driving circuit 21 and the period measuring circuit 21 by an appropriate amount of time. The period measuring circuit 18 measures the period of time Tm between rotor position signals outputted by the delay circuit 18. A rotating speed calculator 19 determines the rotational speed of the rotor based upon the period of time Tm between the rotor position signals so as to output the detected rotating speed signal Nr. For example, the rotating speed can be calculated according to the equation "Nr=1/Tm".

The driving circuit 21 controls the timing of the rotor driving signals that are supplied to the respective stator coils for each of the respective phases of the SR motor 22 based upon the rotor position signals that are delayed by the delay circuit 17. Moreover, the driving circuit 21 controls the on-off ratio (duty ratio or pulse width) of the rotor driving signals that are supplied to the respective stator coils for each of the respective phases based on the PWM signals outputted from the PWM circuit 16.

All the above-described circuits may be designed using well-known analog or digital circuit techniques.

Figure 3:
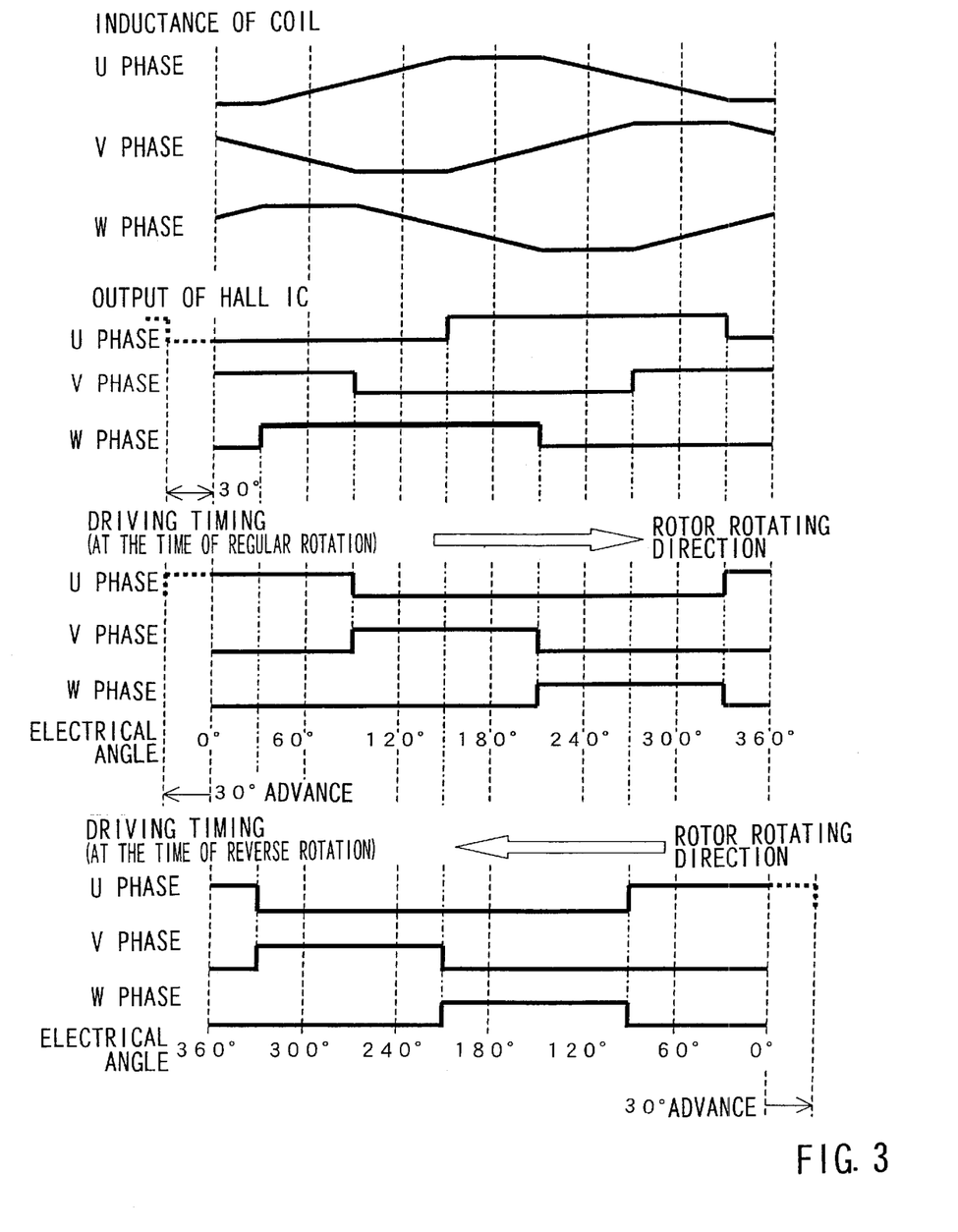
FIG. 3 is a diagram showing a relationship between rotor position signals generated by the rotor position detectors and the timing of rotor driving signals that are supplied to the respective stator coils for each of the respective phases according to the present teachings.

A representative example of a preferred operation SR motor control circuit shown in FIG. 2 will now be described. FIG. 3 is a timing chart showing a representative relationship between the rotor position signals and the timing of the rotor driving signals that are supplied to the respective stator coils for each of the respective phases.

The inductances of the stator coils change according to the rotating positions of the rotor as shown in FIG. 3. Moreover, the output signals of the U-phase, V-phase and W-phase position detectors (Hall ICs 23u–23w) change according to the rotating positions of the rotor as shown in FIG. 3. In the SR motor of FIG. 1, the Hall ICs for the respective phases 23u–23w are offset from the central position of the respective stator poles 1, 2 and 6 by the electrical angle of 30°. Therefore, the phases of the output signals of the Hall ICs of respective phases 23u–23w are advanced by the electrical angle of 30° towards the reverse rotating direction as compared to output signals that are generated in the known SR motor described in FIG. 5 (i.e., in the known SR motor, the Hall ICs are disposed at the central positions of the stator poles).

First, a description will be provided for the case in which the delay time of the delay circuit 17 is set to "0". When the rotor of the SR motor 22 rotates in the forward direction, the driving circuit 21 controls the timing of the rotor driving signals that are supplied to the respective stator coils for each of the respective phases based on the output signals from the Hall ICs of the respective phases 23u–23w according to a forward rotating logic (first logic). In this case, the rotor driving signals may be, for example, supplied respectively to the U-phase coil, V-phase coil and W-phase coil in this order.

More specifically, the rotor driving signal may be supplied to the U-phase stator coil when the trailing edge of the output signal of the U-phase (the same phase as that of the stator coil) Hall IC 23u is detected, and the supply may be stopped when the trailing edge of the output signal of the V-phase (at which next excitation is carried out) Hall IC 23v is detected. Similarly, the rotor driving signal may be supplied to the V-phase stator coil when the trailing edge of the output signal of the V-phase (the same phase as that of the stator coil) Hall IC 23v is detected, and the supply may be stopped when the trailing edge of the output signal of the W-phase (at which next excitation is carried out) Hall IC 23w is detected. Finally, the rotor driving signal may be supplied to the W-phase stator coil when the trailing edge of the output signal of the W-phase (the same phase as the stator coil) Hall IC 23w is detected, and the supply may be stopped when the trailing edge of the output signal of the U-phase (at which next excitation is carried out) Hall IC 23u is detected.

As shown in FIG. 3, the start timing and end timing of the rotor driving signals that are supplied to the respective stator coils for each of the respective phases are advanced by 30° compared with the start timing and end timing shown in FIG. 6. Therefore, the advance angle can be controlled by the advance angle of 30°. In FIG. 3, the electrical angle when the rotor rotates in the forward direction is represented by a direction when the rotor rotates from the central position of the U-phase stator pole where the angle is 0° with respect to the forward rotating direction (clockwise direction in FIG. 1, right direction in FIG. 3).

In addition, in order to rotate the rotor in the reverse direction, the driving circuit 21 controls the timing of the rotor driving signals that are supplied to the respective stator coils for each of the respective phases based on the output signals of the Hall ICs of respective phases 23u–23w according to a reverse rotating logic (second logic). In this case, the rotor driving signals are supplied respectively to the U-phase coil, W-phase coil and V-phase coil in this order. Specifically, the rotor driving signal may be supplied to the U-phase stator coil when the trailing edge of the output signal of the W-phase (at which next excitation is carried out) Hall IC 23w is detected, and the supply may be stopped when the trailing edge of the output signal of the V-phase (at which previous excitation is carried out) Hall IC 23v is detected. Similarly, the rotor driving signal may be supplied to the W-phase stator coil when the trailing edge of the output signal of the V-phase (at which next excitation is carried out) Hall IC 23v is detected, and the supply may be stopped when the trailing edge of the output signal of the U-phase (at which previous excitation is carried out) Hall IC 23u is detected. Finally, the rotor driving signal may be supplied to the V-phase stator coil when the trailing edge of the output signal of the U-phase (at which next excitation is carried out) Hall IC 23u is detected, and the supply may be stopped when the trailing edge of the output signal of the W-phase (at which previous excitation is carried out) Hall IC 23w is detected.

As shown in FIG. 3, the timing of the rotor driving signals that are supplied to the respective stator coils for each of the respective phases is advanced by 30° compared with the timing of the rotor driving signals shown in FIG. 6. Therefore, the advance angle can be controlled by the advance angle of 30°. In FIG. 3, the electrical angle when the rotor rotates in the reverse direction is represented by a direction when the rotor rotates from the central position of the U-phase stator pole where the angle is 0° with respect to the reverse direction (counterclockwise direction in FIG. 1, left direction in FIG. 3).

As described above, in the representative SR motor of FIG. 1, the rotor position detectors for each of the respective phases (i.e., Hall ICs 23u–23w) are provided at positions that are offset from the central position of the stator poles by the electrical angle of 30° with respect to the reverse rotating direction. As a result, when the rotor rotates in the forward direction, the advance angle can be controlled by the advance angle of 30° based upon the output signals of the rotor position detectors 23u–23w according to the forward rotating logic. Likewise, when the rotor rotates in the reverse direction, the advance angle can be controlled by the advance angle of 30° based upon the output signals of the rotor position detectors 23u–23w according to the reverse rotating logic. Thus, the advance angle can be controlled with the same motor properties when the rotor rotates in both the forward direction and reverse direction by a reduced number of rotor position detectors.

Figure 4:
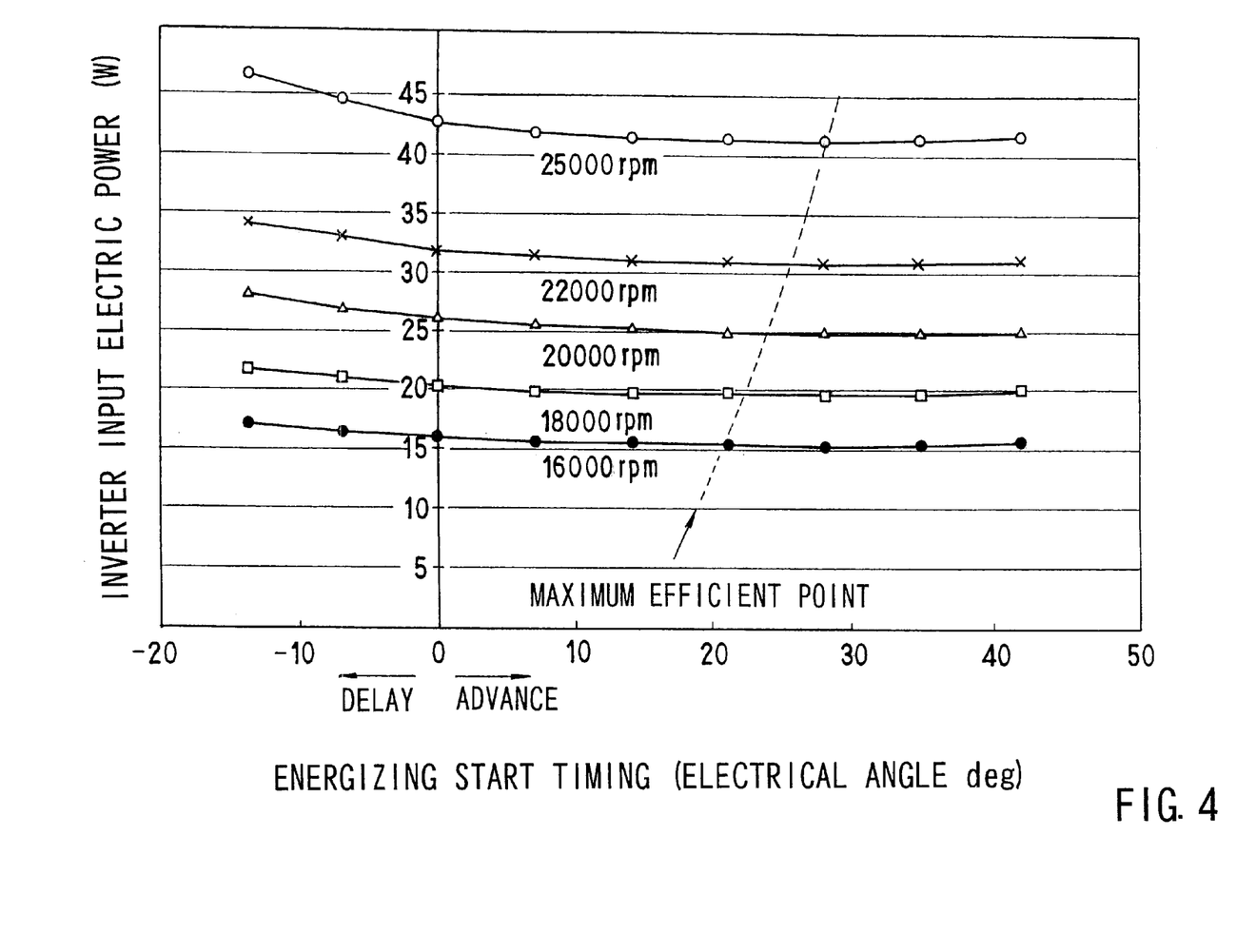
FIG. 4 is a diagram showing a relationship between motor rotating speeds and the advance angle that maximizes motor operational efficiency.

As mentioned above, in the representative SR motor, the timing at which the rotor driving signals are started to be supplied to the respective stator coils for the respective phases (energizing start timing) is advanced (advance angle control) so that the motor operating efficiency can be improved. As shown in FIG. 4, the energizing start timing that will maximize motor operation efficiency varies according to the rotating speed of the motor. The processing unit 10 of FIG. 2 can adjust the time at which the rotor position signals are supplied to the driving circuit 21. Therefore, the processing unit 10 of the present embodiment sets the delay time of the delay circuit 17 according to the rotating speed of the motor, i.e., the rotating speed detected signal Nr outputted from the detected rotor speed detector 19, for example. The delay time is selected to utilize the advance angle (energizing start timing) that will maximize the motor operating efficiency for the particular motor rotating speed. The driving circuit 21 determines the timing of the rotor driving signals that are supplied to the respective stator coils for each of the respective phases based on the rotor position signals outputted from the delay circuit 17 according to the forward rotating logic or reverse rotating logic.

As discussed above, in the present embodiment, the delay time of the delay circuit 17 can be set to the delay time in accordance with the advance angle at which the maximum motor efficiency can be obtained at the motor rotating speed at that time. For this reason, the advance angle can be always controlled by the advance angle at which the motor efficiency is maximum, and the motor operating efficiency is improved.

According to the present teachings, low resolution rotor position detectors, such as Hall ICs, may be utilized. However, in this case it may be difficult to accurately position the rotor position detectors by the specified offset angle from the central positions of the stator poles. In order to overcome this potential inaccuracy, after the rotor position detectors are disposed at appropriate positions, the delay time of the delay circuit can be adjusted so that the positions of the rotor position detectors can be accurately set to a specified advance angle, thereby simplifying the rotor position detector mounting operation.

The present teachings may be appropriately modified without departing from the spirit of the invention.

For example, the forward rotating logic and reverse rotating logic used in the driving circuit can be appropriately modified according to the positions where the position detectors are provided, the output properties of the rotor position detectors and other similar considerations.

Further, the advance angle can simply be fixed at 30°, thereby obviating the need for the delay circuit 17.

While the rotor driving signals are PWM controlled according to the deviation between a reference speed signal and a detected speed signal in the representative embodiment, this technique is only an example and the rotor driving signals also can be controlled by methods other than PWM control. Further, while the rotor driving signals are controlled based on the difference between a reference speed signal and a detected speed signal in the representative embodiment, the rotor driving signals may be constant.

Moreover, while the representative embodiment described a 6-4-pole three-phase SR motor, the SR motor and corresponding control circuit can be appropriately changed to other three-phase SR motors, such as 6-8-pole, 12-8-pole, 18-12-pole and the like.

While the representative embodiment described a motor in which permanent magnets are provided in the rotor, the permanent magnets may instead be provided in the stator. Finally, although the representative embodiment described a SR motor, the control circuit of the present teachings can be applied to various synchronous motors other than SR motors.

What is claimed is:

1. A synchronous motor and control circuit therefor comprising a stator having a plurality of stator poles, a corresponding plurality of coils wound around the stator poles, a rotor having magnets that provide magnetic regions to the rotor, a plurality of rotor position detectors disposed on the stator poles and a rotor driving control circuit coupled to the rotor position detectors and controlling the timing of rotor driving signals to be supplied to the respective coils for each respective phase, characterized in that:

the respective rotor position detectors are each disposed at a position that is advanced by an electrical angle of 30° in one rotating direction from a central position of each stator pole, and wherein the rotor driving control circuit uses a first logic to generate rotor driving signals to rotate the rotor in a forward direction and the rotor driving control circuit uses a second logic to generate rotor driving signals to rotate the rotor in a reverse direction.

2. A synchronous motor and control circuit therefor according to claim 1, wherein the rotor driving control circuit comprises a delay circuit for delaying the rotor position signals outputted from said rotor position detectors, and wherein said rotor driving control circuit controls the timing of the rotor driving signals to be supplied to said stator coils for each of the respective phases based on the rotor position signals that are delayed by said delay circuit.

3. A synchronous motor and control circuit therefor according to claim 2, further comprising a rotor speed calculator for detecting the rotating speed of the rotor, wherein the delay time of said delay circuit is set according to a detected rotating speed of the rotor.

4. A synchronous motor and control circuit therefor according to claim 1, wherein said rotor driving control circuit controls the rotor driving signals to be supplied to said stator coils for each of the respective phases according to a difference between a desired speed set signal stored in the rotor driving control circuit and a detected speed signal generated by a rotating speed calculator coupled to the rotor position detectors.

5. A synchronous motor and control circuit therefor according to claim 1, wherein the stator coils are coupled to provide a three phase synchronous motor.

6. A synchronous motor and control circuit therefor according to claim 1, wherein the synchronous motor is a switched reluctance motor.

7. A synchronous motor and control circuit therefor according to claim 1, wherein said rotor position detectors are Hall ICs.

8. An apparatus comprising:

a synchronous motor comprising a stator having a plurality of stator poles, a corresponding plurality of coils wound around the stator poles, a rotor having magnets that provide magnetic regions to the rotor, a plurality of rotor position detectors disposed on the stator poles, wherein the respective rotor position detectors are each disposed at a position that is advanced by an electrical angle of 30° in one rotating direction from a central position of each of the stator poles and a rotor driving control circuit coupled to the rotor position detectors and controlling the timing of rotor driving signals to be supplied to the respective coils for each respective phase, wherein the rotor driving control circuit uses a first logic to generate rotor driving signals to rotate the rotor in a forward direction and the rotor driving control circuit uses a second logic to generate rotor driving signals to rotate the rotor in a reverse direction.

9. An apparatus as in claim 8, wherein the synchronous motor is a switched reluctance motor and the rotor driving control circuit comprises a delay circuit for delaying the rotor position signals outputted from said rotor position detectors and a rotor speed calculator coupled to the delay circuit, and wherein said rotor driving control circuit controls the timing of the rotor driving signals to be supplied to said stator coils for each of the respective phases based on the rotor position signals that are delayed by said delay circuit, wherein the delay time of said delay circuit is set according to a rotating speed of the switched reluctance motor generated by the rotor speed calculator, wherein said rotor driving control circuit controls the amplitude of the rotor driving signals to be supplied to said stator coils for each of the respective phases according to a detected difference between a reference speed stored in the rotor driving control circuit and a detected speed signal outputted by the rotor speed calculator, wherein the stator coils are coupled to provide a three phase reluctance motor and wherein said rotor position detectors are Hall ICs.

10. An apparatus as in claim 9, wherein a single rotor position detector is attached to one stator pole for each respective phase.

11. A switched reluctance motor and control circuit comprising:
- a stator having a plurality of stator poles,
- a corresponding plurality of coils wound around the stator poles,
- a rotor having magnets that provide magnetic regions to the rotor,
- one rotor position detector disposed on each stator pole, wherein the respective rotor position detectors are each disposed at a position that is advanced by an electrical angle of 30° in one rotating direction from a central position of each of the stator poles and
- a processor receiving rotor position signals from the rotor position detectors, the processor comprising means for determining the rotating speed of the rotor based upon the rotor position signals, means for generating a difference signal based upon a difference between the determined rotating speed and a reference speed stored in the processor, first logic means for generating forward rotor driving signals and second logic means for generating reverse rotor driving signals, wherein the forward and reverse rotor driving signals are supplied to the respective stator coils to drive the rotor.

12. A switched reluctance motor as in claim 11, wherein the processor further comprises means for delaying the rotor position signals outputted from the respective rotor position detectors, whereby the timing of the forward and reverse rotor driving signals are adjustably delayed.

13. A switched reluctance motor as in claim 12, the processor further comprises means for determining the rotating speed of the rotor based upon the rotor position signals, wherein the timing of the forward and reverse rotor driving signals are adjustably delayed based upon the determined rotating speed of the rotor.

14. A switched reluctance motor as in claim 13, the processor further comprises means for generating a difference signal based upon a difference between the determined rotating speed of the rotor and a reference speed stored in the processor, wherein the amplitude of the forward and reverse rotor driving signals is adjusted by the difference signal.

15. A switched reluctance motor and control circuit comprising:
- a stator having a plurality of stator poles,
- a corresponding plurality of coils wound around the stator poles,
- a rotor having a plurality of rotor poles and a plurality of magnets that provide distinct magnetic regions to the rotor, wherein a magnetic boundary exists between each two adjacent magnetic regions,
- a plurality of rotor position detectors disposed on the stator poles, wherein the respective rotor position detectors are each disposed at a position that is advanced by an electrical angle of 30° in one rotating direction from the magnetic boundary between two adjacent magnetic regions when one rotor pole is aligned with one stator pole, and
- a processor receiving rotor position signals from the rotor position detectors, the processor comprising first logic means for generating forward rotor driving signals and second logic means for generating reverse rotor driving signals, wherein the forward and reverse rotor driving signals are supplied to the respective stator coils to drive the rotor.

16. A switched reluctance motor as in claim 15, wherein the processor further comprises means for delaying the rotor position signals outputted from the respective rotor position detectors, whereby the timing of the forward and reverse rotor driving signals are adjustably delayed.

17. A switched reluctance motor as in claim 16, the processor further comprises means for determining the rotating speed of the rotor based upon the rotor position signals, wherein the timing of the forward and reverse rotor driving signals are adjustably delayed based upon the determined rotating speed of the rotor.

18. A switched reluctance motor as in claim 17, the processor further comprises means for generating a difference signal based upon a difference between the determined rotating speed and a reference speed stored in the processor, wherein the amplitude of the forward and reverse rotor driving signals is adjusted by the difference signal.

19. A switched reluctance motor as in claim 18, wherein magnetic boundaries are disposed in substantially a center position of the respective rotor poles and the respective rotor position detectors are advanced by an electrical angle of 30° in one rotating direction from a central position of each of the stator poles.

* * * * *

UNITED STATES PATENT AND TRADEMARK OFFICE
CERTIFICATE OF CORRECTION

PATENT NO. : 6,433,503 B1
DATED : August 13, 2002
INVENTOR(S) : Uematsu et al.

It is certified that error appears in the above-identified patent and that said Letters Patent is hereby corrected as shown below:

Column 5,
Line 12, please delete "sunchronous" and insert therefor -- synchronous --;

Column 10,
Lines 38-39, please delete "detectors a re Hall" and insert therefor -- detectors are Hall --.

Signed and Sealed this

Eleventh Day of February, 2003

JAMES E. ROGAN
*Director of the United States Patent and Trademark Office*